(12) United States Patent
Kuwabara

(10) Patent No.: US 6,775,059 B2
(45) Date of Patent: Aug. 10, 2004

(54) NEAR INFRARED ABSORPTION MATERIAL

(75) Inventor: Shin Kuwabara, Chiba (JP)

(73) Assignee: Nisshinbo Industries, Inc., Tokyo (JP)

( * ) Notice: Subject to any disclaimer, the term of this patent is extended or adjusted under 35 U.S.C. 154(b) by 208 days.

(21) Appl. No.: 10/026,906

(22) Filed: Dec. 27, 2001

(65) Prior Publication Data

US 2002/0127395 A1 Sep. 12, 2002

(30) Foreign Application Priority Data

Dec. 28, 2000 (JP) .......................... 2000-400914

(51) Int. Cl.[7] .......................... F21V 9/04; B32B 27/36; C08F 126/06
(52) U.S. Cl. .................. 359/359; 359/350; 359/885; 428/412; 428/426; 428/430; 428/480; 252/587; 526/259; 526/261
(58) Field of Search ................................ 428/412, 426, 428/430, 480; 359/350, 359, 885; 252/587; 526/259, 261

(56) References Cited

U.S. PATENT DOCUMENTS 6,104,530 A * 8/2000 Okamura et al. .......... 359/359
6,307,671 B1 * 10/2001 Yabuki ....................... 359/361

FOREIGN PATENT DOCUMENTS

JP 2000-250420 * 9/2000 ............. G09F/9/00

* cited by examiner

Primary Examiner—James J. Seidleck
Assistant Examiner—Thao Tran
(74) Attorney, Agent, or Firm—Kubovcik & Kubovcik

(57) ABSTRACT

The present invention provides a near infrared absorption material comprising:
  a transparent substrate, and
  at least a transparent resin layer formed thereon, containing a near infrared absorption dye and a dye selectively absorbing a light of 550 to 620 nm wavelength region; or, comprising:
  a transparent substrate, and
  at least a transparent resin layer containing a near infrared absorption dye and an adhesive layer containing a dye selectively absorbing a light of 550 to 620 nm wavelength region, both formed on the transparent substrate so that the adhesive layer becomes the outermost layer.

15 Claims, 5 Drawing Sheets

NEAR INFRARED ABSORPTION MATERIAL

BACKGROUND OF THE INVENTION

1. Field of the Invention

The present invention relates to a near infrared absorption material.

2. Description of the Prior Art

In recent years, development of plasma display panel has been active and its products have been put into market. As is easily anticipated from their principle, plasma display panels emit a near infrared light during the plasma discharge; since this near infrared light is close to the near infrared light used by the remote controllers of electronic appliances such as household TVs, air conditioners, video players and the like, plasma displays invite malfunctioning of the electronic appliances placed in the vicinity thereof. Hence, a near infrared absorption filter is often used as a cover plate of plasma display, for absorption and shielding of a near infrared region of 800 to 1,000 nm, particularly 850 to 1,000 nm.

The above near infrared absorption filter has been produced in various forms. Recently, there has also been proposed a near infrared absorption filter which selectively absorbs not only a near infrared light (absorbed by conventional filters) but also an orange light of 550 to 620 nm wavelength region (this orange light gives an unclear image), but absorbs substantially no visible light of other wavelength region and therefore can give a clear image.

For example, JP-A-2000-250420 and JP-A-2000-275432 each disclose a cover plate for an image display device having a plasma display panel, which is a laminate of a transparent substrate, an antireflection layer, an electromagnetic wave-shielding layer, a near infrared absorption layer and a layer for absorption of 560 to 620 nm wavelength light.

In the cover plate for image display disclosed in JP-A-2000-250420, the layer for absorption of 560 to 620 nm wavelength light is formed by dispersing a dye absorbing such a light, in gelatin. However, since a water-soluble gelatin is used as the gelatin, the coated layer formed shows cissing against a substrate made from a polyethylene terephthalate, polyethylene naphthalate, a polyolefin or the like, making it impossible to obtain a uniform coated layer; moreover, the near infrared absorption dye when added tends to be decomposed in gelatin by heat, humidity or the like and is low in weather resistance and durability. Thus, the cover plate disclosed in the above literature has problems.

The cover plate for image display disclosed in JP-A-2000-275432 is formed by dispersing a dye absorbing 560 to 620 nm wavelength light in a PMMA resin. However, in this case as well, the near infrared absorption dye used tends to be decomposed by heat, humidity or the like and is low in weather resistance and durability. Thus, the cover plate disclosed in the above literature has a problem.

SUMMARY OF THE INVENTION

The present invention aims at providing a near infrared absorption material which alleviates the above-mentioned problems of the prior art, which selectively absorbs not only a near infrared light but also an orange light of 550 to 620 nm wavelength region (this orange light gives an unclear image), but absorbs substantially no visible light of other wavelength region and therefore can give a clear image, and which is superior in weather resistance and durability.

According to the resent invention, there is provided a near infrared absorption material comprising:

a transparent substrate, and at least a transparent resin layer formed thereon, containing a near infrared absorption dye and a dye selectively absorbing a light of 550 to 620 nm wavelength region; or a near infrared absorption material comprising:

a transparent substrate, and at least a transparent resin layer containing a near infrared absorption dye and an adhesive layer containing a dye selectively absorbing a light of 550 to 620 nm wavelength region, both formed on the transparent substrate so that the adhesive layer becomes the outermost layer.

DETAILED DESCRIPTION OF THE INVENTION

Figure 1:
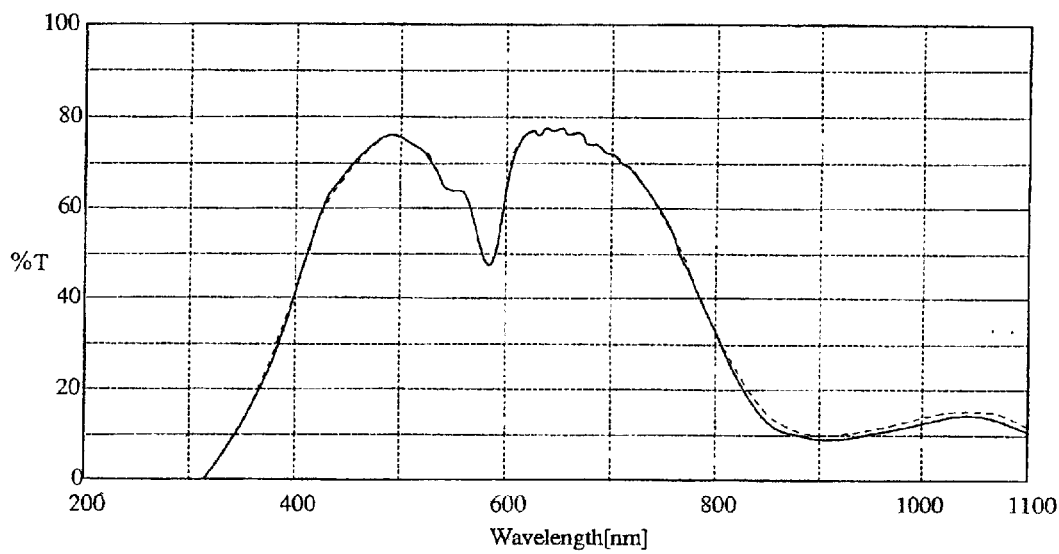
FIG. 1 is the spectra before and after heat resistance test, of the film-shaped infrared absorption material obtained in Example 1.

The present invention is described in detail below.

The transparent substrate used in the near infrared absorption material of the present invention can be any substrate as long as a transparent resin layer can be formed thereon, and is not critical. It is preferably made from a polycarbonate, a polyarylate or both of them, in view of the dye stability mentioned later.

The transparent substrate may also be made from at least one kind selected from a polyethylene terephthalate, polyethylene naphthalate and a polycycloolefin. When they are used, they show high solvent resistance and thermal stability; when, in particular, a polyethylene naphthalate or a polycycloolefin is used and attached to a transparent substrate such as glass or the like, interference infringe appears hardly.

The near infrared absorption material of the present invention comprises:
a transparent substrate, and
at least a transparent resin layer formed thereon, containing a near infrared absorption dye and a dye selectively absorbing a light of 550 to 620 nm wavelength region.
The near infrared absorption material may comprises:
a transparent substrate, and
at least a transparent resin layer containing a near infrared absorption dye and an adhesive layer containing a dye selectively absorbing a light of 550 to 620 nm wavelength region, both formed on the transparent substrate so that the adhesive layer becomes the outermost layer.

In the near infrared absorption material of the present invention, there can be formed, in addition to the transparent resin layer (or the transparent resin layer and the adhesive layer), layers for reflection prevention, glare prevention, reflection and glare prevention, antistatic property, Newton's ring prevention, gas-barrier property, layers for hard coating, staining prevention, etc.

As the near infrared absorption dye used in the near infrared absorption material of the present invention, there can be mentioned, for example, a dithiol-nickel complex represented by the following formula (1):

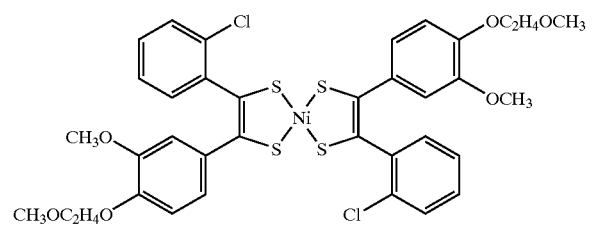

and a least one kind of diimonium compound represented by the following general formula (2):

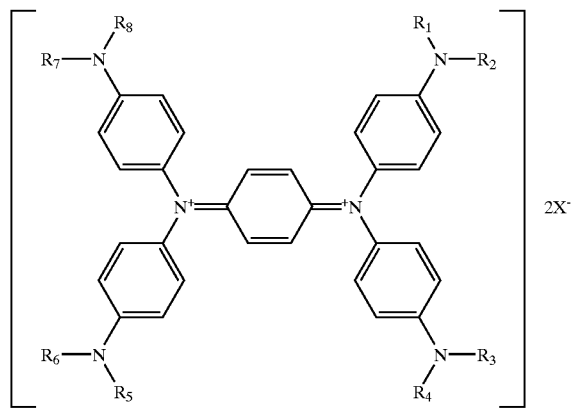

In the above general formula (2), $R_1$ to $R_8$ may be the same or different and are each a hydrogen atom, a $C_{1-12}$ alkyl group or a $C_{6-12}$ aryl group; and X is an anion typified by $SbF_6^-$, $ClO_4^-$, $NO_3^-$ or a halogen ion.

The amount of the near infrared absorption dye used in the transparent resin layer can be, for example, 0.001 to 50% by weight based on the transparent resin used in the layer. When the amount of the near infrared absorption dye is far less than 0.001% by weight, the dye has low absorbability for near infrared light. When the amount is more than 50% by weight, the dye precipitates or causes decomposition or deterioration (this results in change of absorption wavelength region). Thus, with such amounts, the intended properties cannot be met.

To the near infrared absorption dye used in the near infrared absorption material of the present invention may further be added at least one kind of dithiol-nickel complex represented by the following general formula (3):

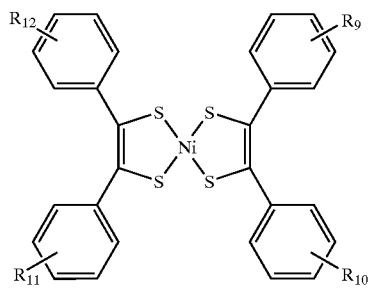

in order to ensure the selective absorption of particular wavelengths of near infrared region.

In the general formula (3), $R_9$ to $R_{12}$ may be the same or different and are each a hydrogen atom, a $C_{1-4}$, alkylene group, an aryl group, an aralkyl group, an alkylamino group, an alkoxy group or a halogen atom.

The dithiol-nickel complex of the general formula (3) is preferably a dithiol-nickel complex represented by the following formula (9):

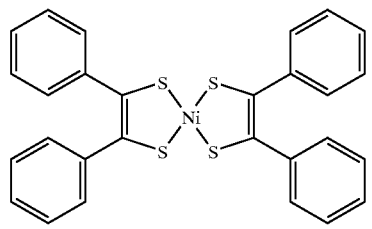

particularly for the absorbability for near infrared light. The amount of the dithiol-nickel complex of the formula (9) added can be, for example, 0.001 to 100% by weight based on the transparent resin. When the amount of the dithiol-nickel complex of the formula (9) is far less than 0.001% by weight, the dye has low absorbability for near infrared light. When the amount is more than 100% by weight, the dye precipitates or causes decomposition or deterioration (this results in change of absorption wavelength region). Thus, with such amounts, the intended properties cannot be met.

To the near infrared absorption dye used in the near infrared absorption material of the present invention may furthermore be added at least one kind of polymethine dye represented by the following general formula (4):

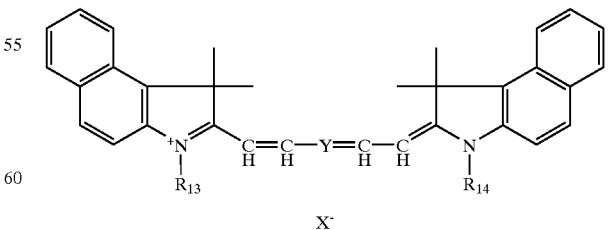

in order to ensure the selective absorption of particular wavelengths of near infrared region.

In the general formula (4), $R_{13}$ and $R_{14}$ may be the same or different and are each a hydrogen atom, a $C_{1-12}$ alkyl group, a $C_{6-12}$ aryl group, an alkenyl group, an aralkyl group or an alkinyl group; Y is a sulfur atom, a methine group or a chlorocyclohexene group; and X is an anion typified by $SbF_6^-$, $ClO_4^-$, $NO_3^-$ or a halogen ion.

The amount of the polymethine dye can be, for example, 0.001 to 50% by weight based on the transparent resin. When the amount of the polymethine dye is far less than 0.001% by weight, the dye has low absorbability for near infrared light. When the amount is more than 50% by weight, the dye precipitates or causes decomposition or deterioration (this results in change of absorption wavelength region) Thus, with such amounts, the intended properties cannot be met.

As specific examples of the polymethine dye of the general formula (4), there can be mentioned compounds represented by the following formula (5):

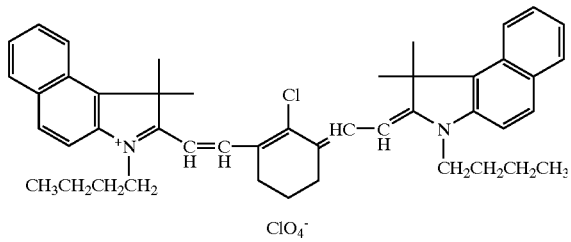

Meanwhile, as the dye selectively absorbing a light of 550 to 620 wavelength region, used in the near infrared absorption material of the present invention, there can be mentioned, for example, at least one kind of cyanin dye represented by the following general formula (6):

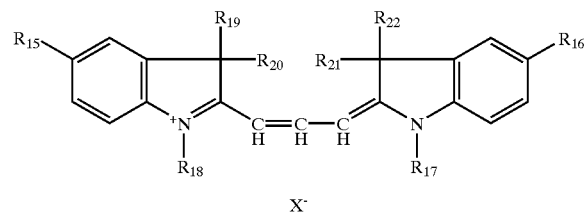

In the general formula (6), $R_{15}$, $R_{16}$, $R_{19}$, $R_{20}$, $R_{21}$ and $R_{22}$ may be the same or different and are each a hydrogen atom, a $C_{1-12}$ alkyl or alkoxy group, an amino group, a cyano group, a nitro group or a carboxyl group; $R_{17}$ and $R_{18}$ may be the same or different and are each a hydrogen atom, a $C_{1-12}$ alkyl group, a $C_{6-12}$ aryl group, an alkenyl group, an aralkyl group or an alkinyl group; and X is an anion typified by $SbF_6^-$, $ClO_4^-$, $NO_3^-$ or a halogen ion.

As specific examples of the dye selectively absorbing a light of 550 to 620 nm wavelength region, there can be mentioned at least one cyanin dye selected from the dyes represented by the following general formula (7):

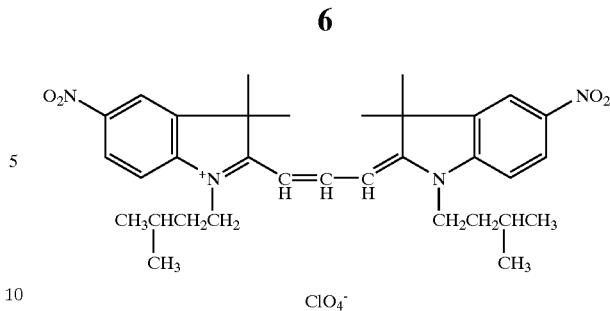

and the dyes represented by the following general formula (8):

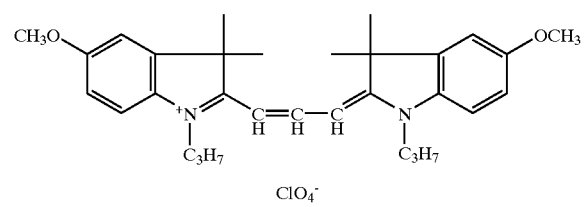

The dye selectively absorbing a light of 550 to 620 nm wavelength region can be added into either or both of the adhesive layer and the transparent resin layer. The amount of the dye added into the adhesive layer or the transparent resin layer can be, for example, 0.0001 to 50% by weight, preferably 0.0002 to 20% by weight based on the adhesive in the adhesive layer or the transparent resin in the transparent resin layer.

The method for forming the transparent resin layer on the transparent substrate is not critical. The transparent resin layer can be formed, for example, by dissolving the near infrared absorption dye, the dye selectively absorbing a light of 550 to 620 nm wavelength region and the transparent resin all mentioned above, in an organic solvent compatible with them, coating the resulting solution on the above-mentioned transparent substrate using a roll coater, a die coater, a gravure cater or the like, and evaporating the organic solvent in the coated solution at room temperature or by single or combination use of ventilation, ventilation and heating, far infrared heating, electromagnetic wave heating, etc. to dry the coated solution.

The method for forming the adhesive layer is not critical, either. The adhesive layer can be formed, for example, by dissolving the near infrared absorption dye, the dye selectively absorbing a light of 550 to 620 nm wavelength region and the transparent resin all mentioned above, in an organic solvent compatible with them, coating the resulting solution on a release film by use of a roll coater, a die coater, a gravure coater or the like, evaporating the solvent in the coated solution at room temperature or by single or combination use of ventilation, ventilation and heating, far infrared heating, electromagnetic wave heating, etc. to dry the coated solution, and laminating the resulting material on a transparent substrate.

The adhesive layer is formed on the transparent resin layer or on the opposite side of the transparent substrate, as the outermost layer of the near infrared absorption material of the present invention.

The thickness of the transparent resin layer is 0.1 to 30 μm, preferably 0.5 to 15 μm; and the thickness of the adhesive layer is preferably 0.1 to 50 μm.

The near infrared absorption material can be used for production of a filter for plasma display panel, by laminating it with layers for reflection prevention, glare prevention, reflection and glare prevention, antistatic property, Newton's ring prevention, gas-barrier property, layers for hard coating, staining prevention, etc., a transparent electroconductive layer and an electromagnetic wave-shielding layer (a metal-made geometric pattern), by a hot press or a laminator, without using any adhesive or via an adhesive, an adhesive film or both of them.

The present invention is described in detail below by way of Examples and Comparative Examples.

EXAMPLE 1

In 100 parts by weight of 1,3-dioxolane were dissolved 18 parts by weight of a polycarbonate [Panlite L1250Z (trade name), produced by Teijin Chemicals Ltd.], 0.07 part by weight of a dithiol-nickel complex represented by the above-shown formula (1), 0.2 part by weight of a dithiol-nickel complex represented by the above-shown formula (9), 0.2 part by weight of a diimonium compound dye represented by the following formula (10):

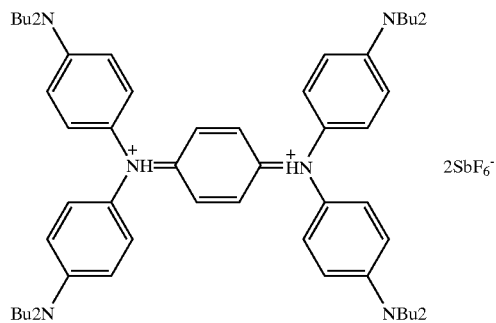

and 0.008 part by weight of a cyanin compound dye represented by the above-shown formula (7). The resulting solution was cast on a polyester film by use of a bar coater having a gap distance of 100 μm [Doctor Blade YD-2 (trade name), produced by Yoshimitsu Seiki K.K.] and dried at 90° C. for 3 minutes to obtain a film-shaped near infrared absorption material. The coated surface of the material was free from cissing or the like and had sufficient uniformity.

The film-shaped near infrared absorption material was subjected to a heat resistance test of 90° C.×500 hours. In FIG. 1 are shown the spectra of the near infrared absorption material before and after the heat resistance test; in Table 1 are shown the transmitted chromaticities of the near infrared absorption material before and after the heat resistance test. As seen from the spectra, an orange light region of 550 to 620 nm and a near infrared light region of 850 to 1,000 nm are sufficiently shielded and the transmittance for visible light is good. Further, even after the heat resistance test of 500 hours, the decomposition of dyes is kept low and there is substantially no change in spectrum or chromaticity; thus, the film-shaped near infrared absorption material has sufficient heat resistance over a long period as a PDP filter.

EXAMPLE 2

In 100 parts by weight of 1,3-dioxolane were dissolved 18 parts by weight of a polycarbonate [Panlite L1250Z (trade name), produced by Teijin Chemicals Ltd.], 0.07 part by weight of a dithiol-nickel complex represented by the above-shown formula (1), 0.2 part by weight of a dithiol-nickel complex represented by the above-shown formula (9), 0.2 part by weight of a diimonium compound dye represented by the above-shown formula (10) and 0.02 part by weight of a cyanin compound dye represented by the above-shown formula (8). The resulting solution was cast on a polyester film by use of a bar coater having a gap distance of 100 μm [Doctor Blade YD-2 (trade name), produced by Yoshimitsu Seiki K.K.] and dried at 90° C. for 3 minutes to obtain a film-shaped near infrared absorption material. The coated surface of the material was free from cissing or the like and had sufficient uniformity.

Figure 2:
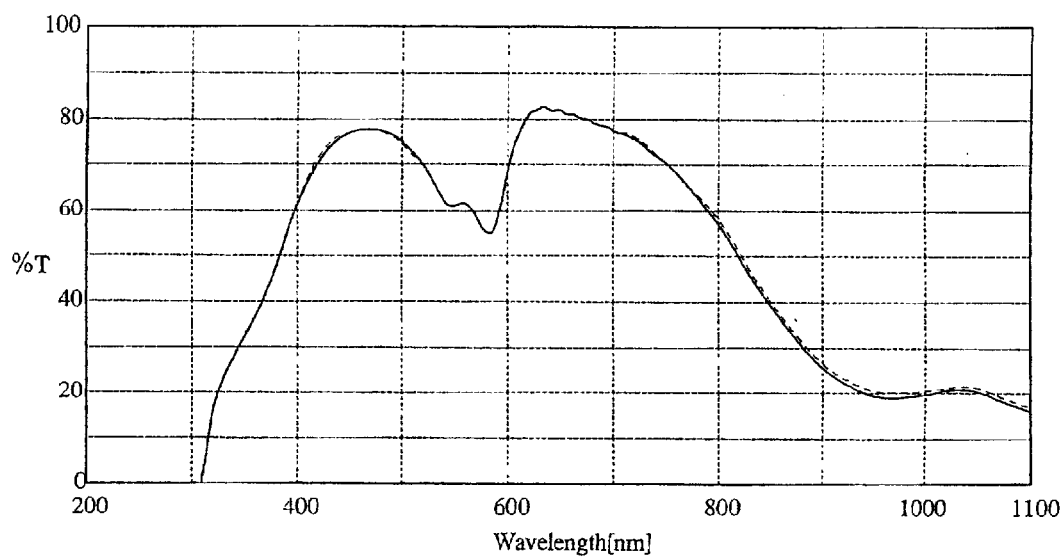
FIG. 2 is the spectra before and after heat resistance test, of the film-shaped infrared absorption material obtained in Example 2.

The film-shaped near infrared absorption material was subjected to a heat resistance test of 90° C.×500 hours. In FIG. 2 are shown the spectra of the near infrared absorption material before and after the heat resistance test; in Table 1 are shown the transmitted chromaticities of the near infrared absorption material before and after the heat resistance test. As seen from the spectral chart, an orange light region of 550 to 620 nm and a near infrared light region of 850 to 1,000 nm are sufficiently shielded and the transmittance for visible light is good. Further, even after the heat resistance test of 500 hours, the decomposition of dyes is kept low and there is substantially no change in spectrum or chromaticity; thus, the film-shaped near infrared absorption material has sufficient heat resistance over a long period as a PDP filter.

EXAMPLE 3

In 100 parts by weight of 1,3-dioxolane were dissolved 18 parts by weight of a polycarbonate [Panlite L1250Z (trade name), produced by Teijin Chemicals Ltd.], 0.07 part by weight of a dithiol-nickel complex represented by the above-shown formula (1), 0.2 part by weight of a dithiol-nickel complex represented by the above-shown formula (9), 0.2 part by weight of a diimonium compound dye represented by the above-shown formula (10) and 0.016 part by weight of a cyanin compound dye represented by the above-shown formula (6). The resulting solution was cast on a polyester film by use of a bar coater having a gap distance of 100 μm [Doctor Blade YD-2 (trade name), produced by Yoshimitsu Seiki K.K.] and dried at 90° C. for 3 minutes to obtain a film-shaped near infrared absorption material. The coated surface of the material was free from cissing or the like and had sufficient uniformity.

Figure 3:
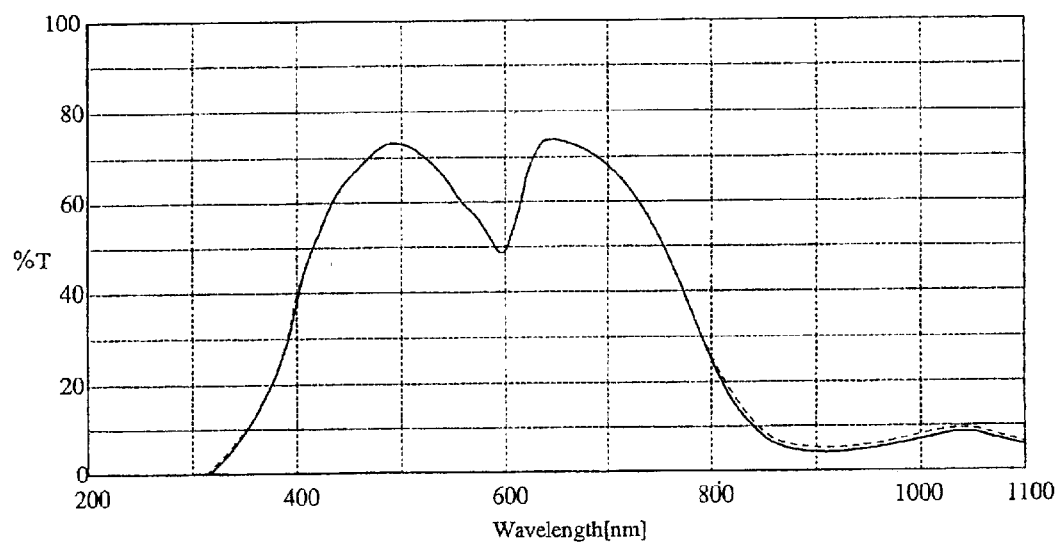
FIG. 3 is the spectra before and after heat resistance test, of the film-shaped infrared absorption material obtained in Example 3.

The film-shaped near infrared absorption material was subjected to a heat resistance test of 90° C.×500 hours. In FIG. 3 are shown the spectra of the near infrared absorption material before and after the heat resistance test; in Table 1 are shown the transmitted chromaticities of the near infrared absorption material before and after the heat resistance test. As seen from the spectral charts, an orange light region of 550 to 620 nm and a near infrared light region of 850 to 1,000 nm are sufficiently shielded and the transmittance for visible light is good. Further, even after the heat resistance test of 500 hours, the decomposition of dyes is kept low and there is substantially no change in spectrum or chromaticity; thus, the film-shaped near infrared absorption material has sufficient heat resistance over a long period as a PDP filter.

EXAMPLE 4

In 100 parts by weight of dichloromethane were dissolved 10 parts by weight of a polyarylate resin [U Polymer D Powder (trade name), produced by Unitika Ltd.], 0.03 part by weight of a dithiol-nickel complex represented by the above-shown formula (1), 0.9 part by weight of a dithiol-nickel complex represented by the above-shown formula (9), 0.13 part by weight of a diimonium compound dye represented by the above-shown formula (10) and 0.075 part by weight of a cyanin compound dye represented by the above-shown formula (7). The resulting solution was cast on a polyester film by use of a bar coater having a gap distance of 100 µm [Doctor Blade YD-2 (trade name), produced by Yoshimitsu Seiki] and dried at 90° C. for 3 minutes to obtain a film-shaped near infrared absorption material. The coated surface of the material was free from cissing or the like and had sufficient uniformity.

Figure 4:
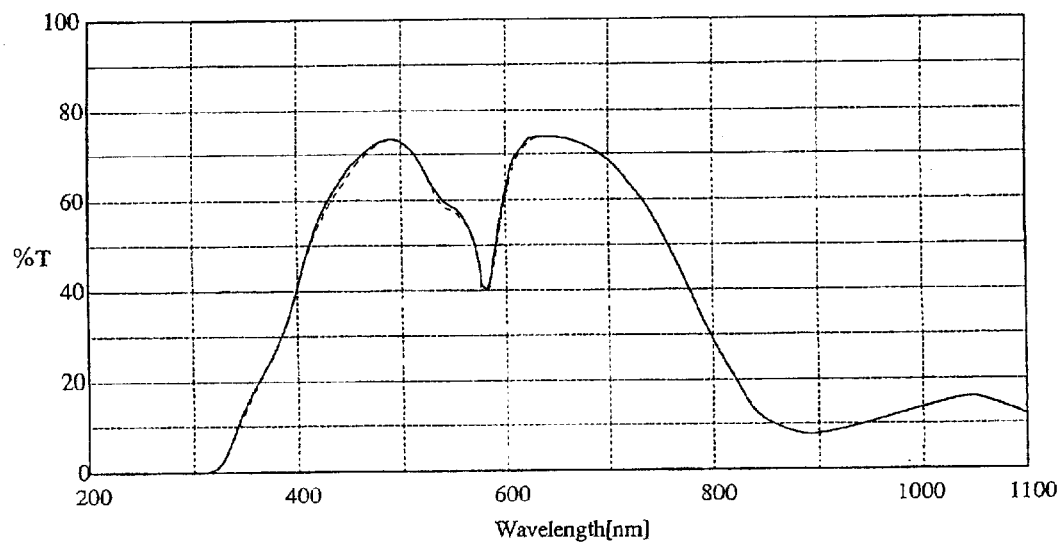
FIG. 4 is the spectra before and after heat resistance test, of the film-shaped infrared absorption material obtained in Example 4.

The film-shaped near infrared absorption material was subjected to a heat resistance test of 90° C.×500 hours. In FIG. 4 are shown the spectra of the near infrared absorption material before and after the heat resistance test; in Table 1 are shown the transmitted chromaticities of the near infrared absorption material before and after the heat resistance test. As seen from the spectral chart, an orange light region of 550 to 620 nm and a near infrared light region of 850 to 1,000 nm are sufficiently shielded and the transmittance for visible light is good. Further, even after the heat resistance test of 500 hours, the decomposition of dyes is kept low and there is substantially no change in spectrum or chromaticity; thus, the film-shaped near infrared absorption material has sufficient heat resistance over a long period as a PDP filter.

EXAMPLE 5

In 100 parts by weight of dichloromethane were dissolved 10 parts by weight of a polyarylate resin [U Polymer D Powder (trade name), produced by Unitika Ltd.], 0.03 part by weight of a dithiol-nickel complex represented by the above-shown formula (1), 0.9 part by weight of a dithiol-nickel complex represented by the above-shown formula (9), 0.13 part by weight of a diimonium compound dye represented by the above-shown formula (10) and 0.014 part by weight of a cyanin compound dye represented by the above-shown formula (8). The resulting solution was cast on a polyester film by use of a bar coater having a gap distance of 100 µm [Doctor Blade YD-2 (trade name), produced by Yoshimitsu Seiki K.K.] and dried at 90° C. for 3 minutes to obtain a film-shaped near infrared absorption material. The coated surface of the material was free from cissing or the like and had sufficient uniformity.

Figure 5:
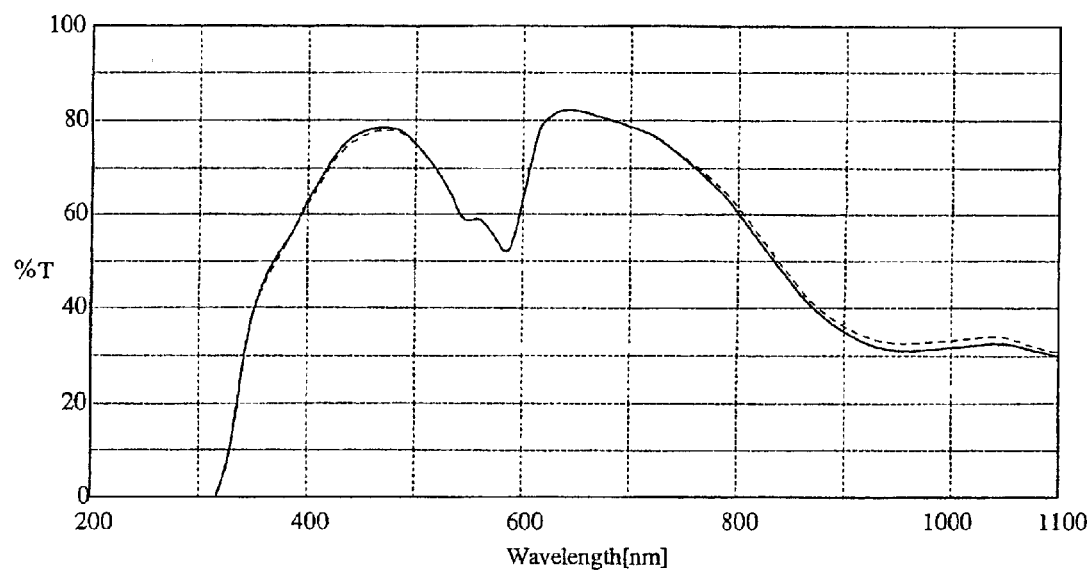
FIG. 5 is the spectra before and after heat resistance test, of the film-shaped infrared absorption material obtained in Example 5.

The film-shaped near infrared absorption material was subjected to a heat resistance test of 90° C.×500 hours. In FIG. 5 are shown the spectra of the near infrared absorption material before and after the heat resistance test; in Table 1 are shown the transmitted chromaticities of the near infrared absorption material before and after the heat resistance test. As seen from the spectral chart, an orange light region of 550 to 620 nm and a near infrared light region of 850 to 1,000 nm are sufficiently shielded and the transmittance for visible light is good. Further, even after the heat resistance test of 500 hours, the decomposition of dyes is kept low and there is substantially no change in spectrum or chromaticity; thus, the film-shaped near infrared absorption material has sufficient heat resistance over a long period as a PDP filter.

EXAMPLE 6

In 100 parts by weight of dichloromethane were dissolved 10 parts by weight of a polyarylate resin [U Polymer D Powder (trade name), produced by Unitika Ltd.], 0.03 part by weight of a dithiol-nickel complex represented by the above-shown formula (1), 0.9 part by weight of a dithiol-nickel complex represented by the above-shown formula (9), 0.13 part by weight of a diimonium compound dye represented by the above-shown formula (10) and 0.012 part by weight of a cyanin compound dye represented by the above-shown formula (6). The resulting solution was cast on a polyester film by use of a bar coater having a gap distance of 100 µm [Doctor Blade YD-2 (trade name), produced by Yoshimitsu Seiki K.K.] and dried at 90° C. for 3 minutes to obtain a film-shaped near infrared absorption material. The coated surface of the material was free from cissing or the like and had sufficient uniformity.

Figure 6:
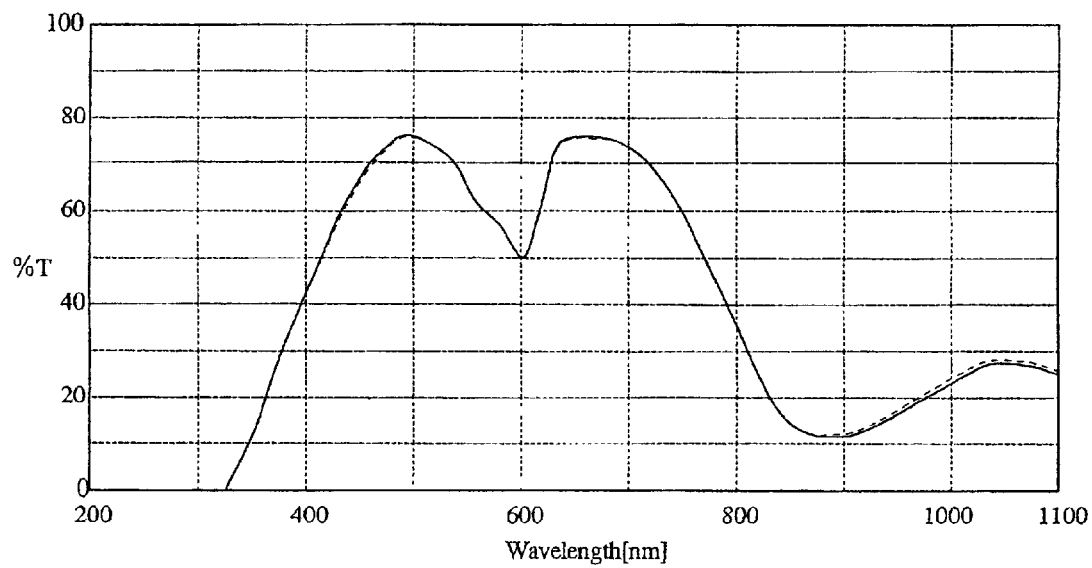
FIG. 6 is the spectra before and after heat resistance test, of the film-shaped the infrared absorption material obtained in Example 6.

The film-shaped near infrared absorption material was subjected to a heat resistance test of 90° C.×500 hours. In FIG. 6 are shown the spectra of the near infrared absorption material before and after the heat resistance test; in Table 1 are shown the transmitted chromaticities of the near infrared absorption material before and after the heat resistance test. As seen from the spectral chart, an orange light region of 550 to 620 nm and a near infrared light region of 850 to 1,000 nm are sufficiently shielded and the transmittance for visible light is good. Further, even after the heat resistance test of 500 hours, the decomposition of dyes is kept low and there is substantially no change in spectrum or chromaticity; thus, the film-shaped near infrared absorption material has sufficient heat resistance over a long period as a PDP filter.

EXAMPLE 7

In 100 parts by weight of 1,3-dioxolane were dissolved 18 parts by weight of a polycarbonate [Panlite L1250Z (trade name), produced by Teijin Chemicals Ltd.], 0.07 part by weight of a dithiol-nickel complex represented by the above-shown formula (1), 0.2 part by weight of a dithiol-nickel complex represented by the above-shown formula (9), 0.2 part by weight of a diimonium compound dye represented by the above-shown formula (10), 0.03 part by weight of a polymethine compound dye represented by the above-shown formula (5) and 0.015 part by weight of a cyanin compound dye represented by the above-shown formula (7). The resulting solution was cast on a polyester film by use of a bar coater having a gap distance of 100 µm [Doctor Blade YD-2 (trade name), produced by Yoshimitsu Seiki K.K.] and dried at 90° C. for 3 minutes to obtain a film-shaped near infrared absorption material. The coated surface of the material was free from cissing or the like and had sufficient uniformity.

Figure 7:
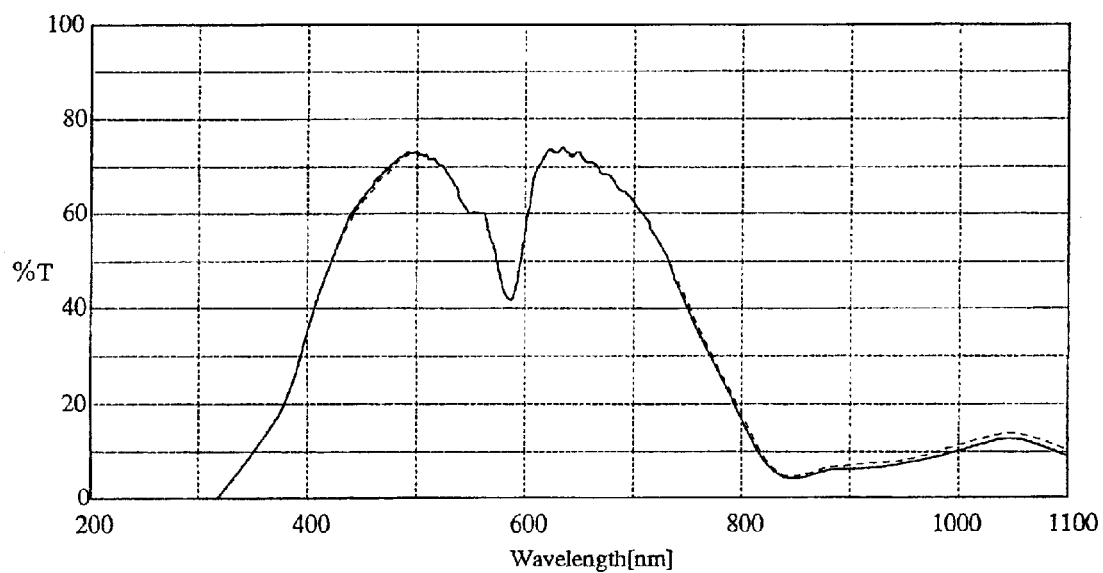
FIG. 7 is the spectra before and after heat resistance test, of the film-shaped infrared absorption material obtained in Example 7.

The film-shaped near infrared absorption material was subjected to a heat resistance test of 90° C.×500 hours. In FIG. 7 are shown the spectra of the near infrared absorption material before and after the heat resistance test; in Table 1 are shown the transmitted chromaticities of the near infrared absorption material before and after the heat resistance test. As seen from the spectral charts, an orange light region of 550 to 620 nm and a near infrared light region of 850 to 1,000 nm are sufficiently shielded and the transmittance for visible light is good. Further, even after the heat resistance test of 500 hours, the decomposition of dyes is kept low and there is substantially no change in spectrum or chromaticity; thus, the film-shaped near infrared absorption material has sufficient heat resistance over a long period as a PDP filter.

EXAMPLE 8

In 100 parts by weight of 1,3-dioxolane were dissolved 18 parts by weight of a polycarbonate [Panlite L1250Z (trade name), produced by Teijin Chemicals Ltd.], 0.07 part by weight of a dithiol-nickel complex represented by the above-shown formula (1), 0.2 part by weight of a dithiol-nickel complex represented by the above-shown formula (9), 0.2 part by weight of a diimonium compound dye represented by the above-shown formula (10), 0.03 part by weight of a polymethine compound dye represented by the above-shown formula (5) and 0.015 part by weight of a cyanin compound dye represented by the above-shown formula (7). The resulting solution was cast on a polyethylene naphthalate by use of a bar coater having a gap distance of 100 µm

[Doctor Blade YD-2 (trade name), produced by Yoshimitsu Seiki K.K.] and dried at 90° C. for 3 minutes to obtain a film-shaped near infrared absorption material. The coated surface of the material was free from cissing or the like and had sufficient uniformity.

The film-shaped near infrared absorption material was subjected to a heat resistance test of 90° C.×500 hours. The spectra and transmitted chromaticities of the near infrared absorption material before and after the heat resistance test were about the same as those of Example 7. As seen from the spectra, an orange light region of 550 to 620 nm and a near infrared light region of 850 to 1,000 nm are sufficiently shielded and the transmittance for visible light is good; further, even after the heat resistance test of 500 hours, the decomposition of dyes is kept low and there is substantially no change in spectrum or chromaticity, therefore, the film-shaped near infrared absorption material has sufficient heat resistance over a long period as a PDP filter.

The film-shaped near infrared absorption material was cut into a size of 200 mm×200 mm and attached, by hot pressing, to a glass plate, a transparent acrylic resin plate and a transparent polycarbonate plate each of 200 mm×200 mm×2 mm (thickness). No interference fringe appeared. Further, the near infrared absorption material cut into the above size was attached, by hot pressing, to each of the above three transparent plates with a meltable pressure-sensitive film interposed between the near infrared absorption material and the transparent plate. No interference fringe appeared. Furthermore, a pressure-sensitive adhesive was placed on the near infrared absorption material cut into the above size, and each of the above three transparent plates was attached to the pressure-sensitive adhesive. No interference fringe appeared.

EXAMPLE 9

In 100 parts by weight of 1,3-dioxolane were dissolved 18 parts by weight of a polycarbonate [Panlite L1250Z (trade name), produced by Teijin Chemicals Ltd.], 0.07 part by weight of a dithiol-nickel complex represented by the above-shown formula (1), 0.2 part by weight of a dithiol-nickel complex represented by the above-shown formula (9), 0.2 part by weight of a diimonium compound dye represented by the above-shown formula (10), 0.03 part by weight of a polymethine compound dye represented by the above-shown formula (5) and 0.015 part by weight of a cyanin compound dye represented by the above-shown formula (7). The resulting solution was cast on a polycycloolefin film by use of a bar coater having a gap distance of 100 μm [Doctor Blade YD-2 (trade name), produced by Yoshimitsu Seiki K.K.] and dried at 90° C. for 3 minutes to obtain a film-shaped near infrared absorption material. The coated surface of the material was free from cissing or the like and had sufficient uniformity.

The film-shaped near infrared absorption material was subjected to a heat resistance test of 90° C.×500 hours. The spectra and transmitted chromaticities of the near infrared absorption material before and after the heat resistance test were about the same as those of Example 7. As seen from the spectral charts, an orange light region of 550 to 620 nm and a near infrared light region of 850 to 1,000 nm are sufficiently shielded and the transmittance for visible light is good; further, even after the heat resistance test of 500 hours, the decomposition of dyes is kept low and there is substantially no change in spectrum or chromaticity, therefore, the film-shaped near infrared absorption material has sufficient heat resistance over a long period as a PDP filter.

The film-shaped near infrared absorption material was cut into a size of 200 mm×200 mm and attached, by hot pressing, to a glass plate, a transparent acrylic resin plate and a transparent polycarbonate plate each of 200 mm×200 mm×2 mm (thickness). No interference fringe appeared. Further, the near infrared absorption material cut into the above size was attached, by hot pressing, to each of the above three transparent plates with a meltable pressure-sensitive film interposed between the near infrared absorption material and the transparent plate. No interference fringe appeared. Furthermore, a pressure-sensitive adhesive was placed on the near infrared absorption material cut into the above size, and each of the above three transparent plates was attached to the pressure-sensitive adhesive. No interference fringe appeared.

COMPARATIVE EXAMPLE 1

In 100 parts by weight of dichloromethane were dissolved 22.2 parts by weight of a polymethyl methacrylate [Acrypet (trade name), produced by Mitsubishi Rayon Co., Ltd.], 0.07 part by weight of a dithiol-nickel complex represented by the above-shown formula (1), 0.2 part by weight of a dithiol-nickel complex represented by the above-shown formula (9), 0.27 part by weight of a diimonium compound dye represented by the above-shown formula (10) and 0.0075 part by weight of a cyanin compound dye represented by the above-shown formula (7). The resulting solution was cast on a polyester film by use of a bar coater having a gap distance of 100 μm [Doctor Blade YD-2 (trade name), produced by Yoshimitsu Seiki K.K.] and dried at 90° C. for 3 minutes to obtain a film-shaped near infrared absorption material.

Figure 8:
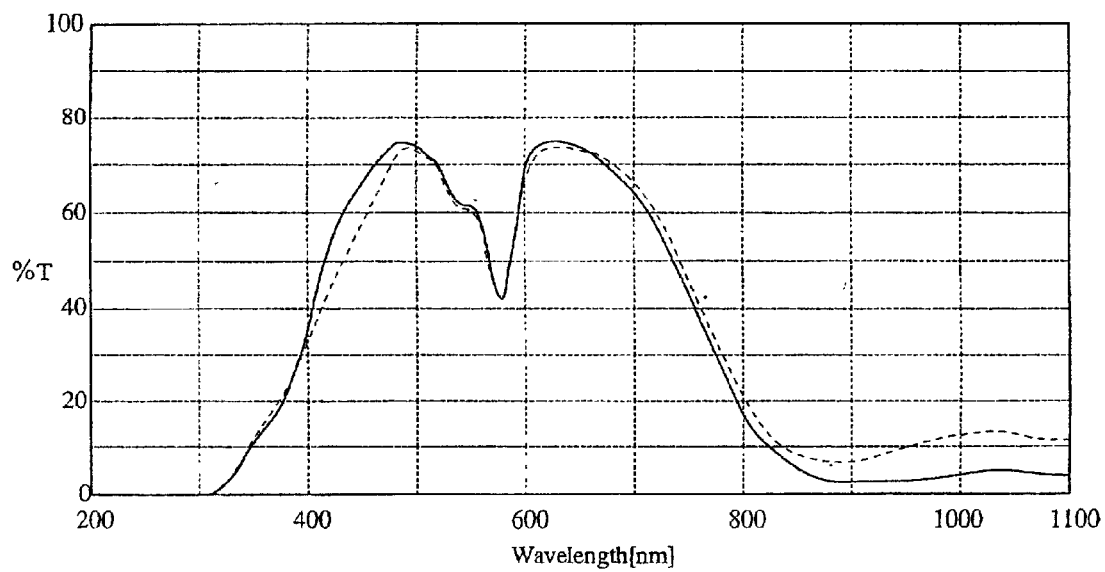
FIG. 8 is the spectra before and after heat resistance test, of the film-shaped infrared absorption material obtained in Comparative Example 1.

The film-shaped near infrared absorption material was subjected to a heat resistance test of 90° C.×500 hours. In FIG. 8 are shown the spectra of the near infrared absorption material before and after the heat resistance test; in Table 1 are shown the transmitted chromaticities of the near infrared absorption material before and after the heat resistance test. As seen from the spectra, after the heat resistance test of 500 hours, absorption particularly in 900 nm or more is weak due to the decomposition of dyes and, moreover, change in chromaticity is large.

COMPARATIVE EXAMPLE 2

In 100 parts by weight of dichloromethane were dissolved 22.2 parts by weight of a polymethyl methacrylate [Acrypet (trade name), produced by Mitsubishi Rayon Co., Ltd.], 0.07 part by weight of a dithiol-nickel complex represented by the above-shown formula (1), 0.2 part by weight of a dithiol-nickel complex represented by the above-shown formula (9), 0.27 part by weight of a diimonium compound dye represented by the above-shown formula (10) and 0.0014 part by weight of a cyanin compound dye represented by the above-shown formula (8). The resulting solution was cast on a polyester film by use of a bar coater having a gap distance of 100 μm [Doctor Blade YD-2 (trade name), produced by Yoshimitsu Seiki K.K.] and dried at 90° C. for 3 minutes to obtain a film-shaped near infrared absorption material.

Figure 9:
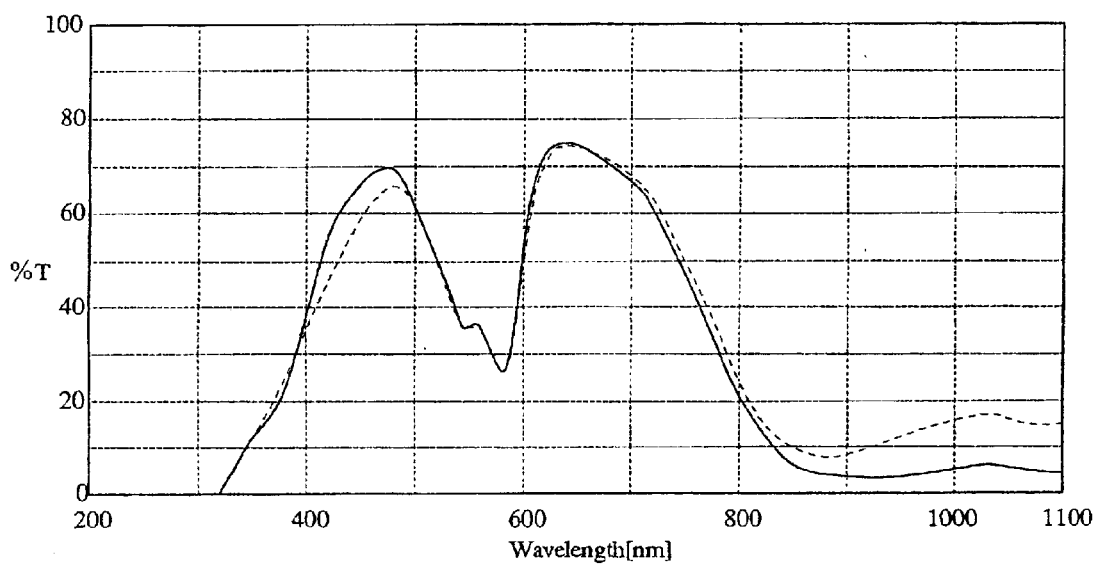
FIG. 9 is the spectra before and after heat resistance test, of the film-shaped infrared absorption material obtained in Comparative Example 2.

The film-shaped near infrared absorption material was subjected to a heat resistance test of 90° C.×500 hours. In FIG. 9 are shown the spectra of the near infrared absorption material before and after the heat resistance test; in Table 1 are shown the transmitted chromaticities of the near infrared absorption material before and after the heat resistance test. As seen from the spectral charts, after the heat resistance test of 500 hours, absorption particularly in 900 nm or more is weak due to the decomposition of dyes and, moreover, change in chromaticity is large.

COMPARATIVE EXAMPLE 3

In 100 parts by weight of dichloromethane were dissolved 22.2 parts by weight of a polymethyl methacrylate [Acrypet (trade name), produced by Mitsubishi Rayon Co., Ltd.], 0.07 part by weight of a dithiol-nickel complex represented by the above-shown formula (1), 0.2 part by weight of a dithiol-nickel complex represented by the above-shown formula (9), 0.27 part by weight of a diimonium compound dye represented by the above-shown formula (10) and 0.012 part by weight of a cyanin compound dye represented by the above-shown formula (6). The resulting solution was cast on a polyester film by use of a bar coater having a gap distance of 100 μm [Doctor Blade YD-2 (trade name), produced by Yoshimitsu Seiki K.K.] and dried at 90° C. for 3 minutes to obtain a film-shaped near infrared absorption material.

Figure 10:
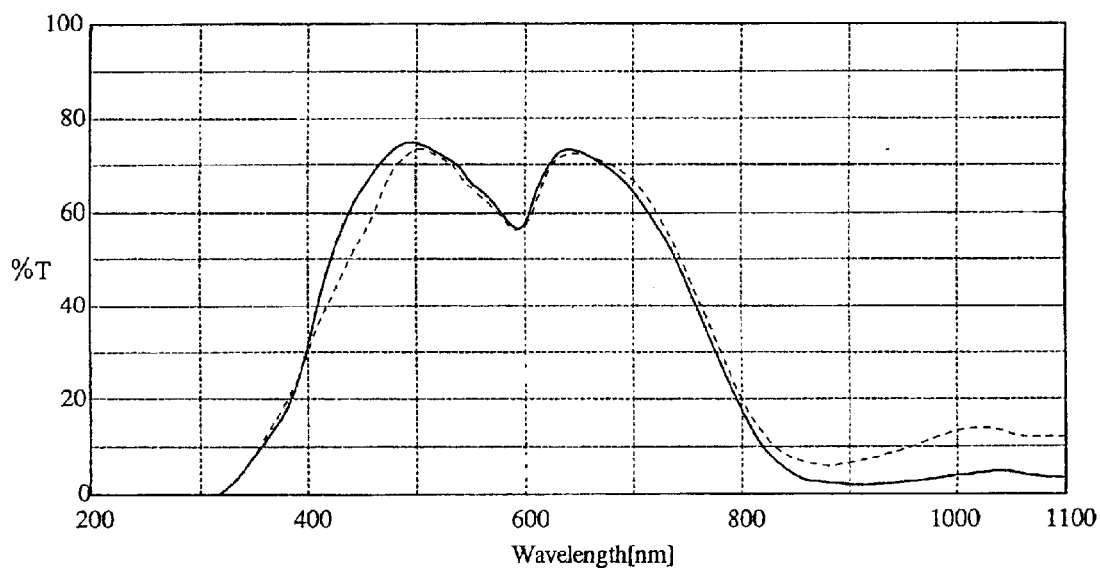
FIG. 10 is the spectra before and after heat resistance test, of the film-shaped infrared absorption material obtained in Comparative Example 3.

The film-shaped near infrared absorption material was subjected to a heat resistance test of 90° C.×500 hours. In FIG. 10 are shown the spectra of the near infrared absorption material before and after the heat resistance test; in Table 1 are shown the transmitted chromaticities of the near infrared absorption material before and after the heat resistance test. As seen from the spectral charts, after the heat resistance test of 500 hours, absorption particularly in 900 nm or more is weak due to the decomposition of dyes and, moreover, change in chromaticity is large.

COMPARATIVE EXAMPLE 4

A 20 wt. % aqueous gelatin solution was cast on a polyester film by use of a bar coater having a gap distance of 100 μm [Doctor Blade YD-2 (trade name), produced by Yoshimitsu Seiki K.K.]. However, no uniform coated layer was formed owing to cissing.

The dyes of the formulas (1), (7), (8), (9) and (10) were insoluble in water.

TABLE 1

Transmitted chromaticities before and after heat resistance test

|  |  | Y | x | y | Δx | Δy |
|---|---|---|---|---|---|---|
| Example 1 | 0 hours | 67.14 | 0.3028 | 0.3148 | | |
| | 500 hours | 67.02 | 0.3028 | 0.3148 | 0 | 0 |
| Example 2 | 0 hours | 70.04 | 0.3011 | 0.3023 | | |
| | 500 hours | 69.94 | 0.3009 | 0.3024 | −0.0002 | 0.0001 |
| Example 3 | 0 hours | 64.99 | 0.2978 | 0.3194 | | |
| | 500 hours | 65.52 | 0.2982 | 0.3199 | 0.0004 | 0.0005 |
| Example 4 | 0 hours | 79.11 | 0.3068 | 0.3186 | | |
| | 500 hours | 79.34 | 0.3072 | 0.3191 | 0.0004 | 0.0005 |
| Example 5 | 0 hours | 67.51 | 0.2964 | 0.2982 | | |
| | 500 hours | 67.72 | 0.2970 | 0.2988 | 0.0006 | 0.0006 |
| Example 6 | 0 hours | 35.90 | 0.2135 | 0.2227 | | |
| | 500 hours | 35.77 | 0.2139 | 0.2233 | 0.0004 | 0.0005 |
| Example 7 | 0 hours | 65.26 | 0.3024 | 0.3176 | | |
| | 500 hours | 65.51 | 0.3028 | 0.3183 | 0.0004 | 0.0007 |
| Comparative Example 1 | 0 hours | 62.36 | 0.3004 | 0.3142 | | |
| | 500 hours | 62.94 | 0.3111 | 0.3272 | 0.0067 | 0.0130 |
| Comparative Example 2 | 0 hours | 48.52 | 0.2914 | 0.2733 | | |
| | 500 hours | 49.11 | 0.2986 | 0.2855 | 0.0072 | 0.0122 |
| Comparative Example 3 | 0 hours | 66.27 | 0.3057 | 0.3253 | | |
| | 500 hours | 66.33 | 0.3121 | 0.3389 | 0.0064 | 0.0316 |

As is clear from the above Examples and Comparative Examples, the near infrared absorption material of the present invention, which comprises a transparent substrate and at least a transparent resin layer formed thereon, containing a near infrared absorption dye and a dye selectively absorbing a light of 550 to 620 nm wavelength region, can selectively absorb an orange light of 550 to 620 nm wavelength region; therefore, the near infrared absorption material enables taking-out of required RGB lights from plasma display panel or the like and can give a color of improved purity.

In other words, with the near infrared absorption material of the present invention, an orange light is absorbed and thereby the image of plasma display panel or the like is made clear.

Further, the near infrared absorption material of the present invention is far superior to the prior art in weather resistance (heat resistance, moisture resistance and durability).

What is claimed is:

1. A near infrared absorption material comprising:

a transparent substrate, and at least a transparent resin layer formed thereon, the transparent resin layer containing a near infrared absorption dye which is a dithiol-nickel complex represented by the following formula (1):

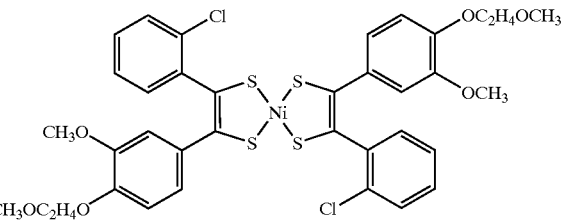

and at least one diimonium compound represented by the following formula (2):

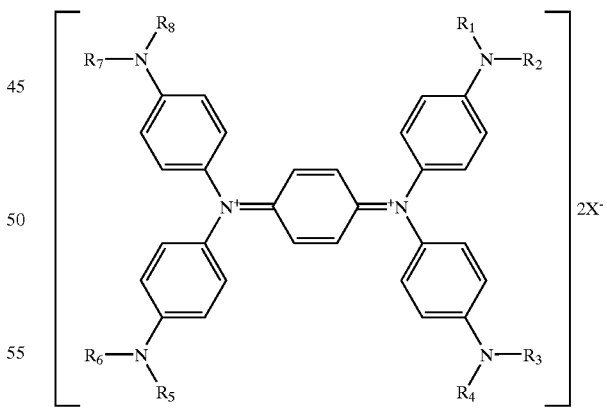

where $R_1$ to $R_8$ are the same or different and are each a hydrogen atoms a $C_{1-12}$, alkyl group or a $C_{6-12}$ aryl group; and X is an anion selected from $SbF_6^-$, $ClO_4^-$, $NO_3^-$ and a halogen ion; a dye selectively absorbing a light of 550 to 620 nm wavelength region; and at least one polymethine dye represented by the following formula (4):

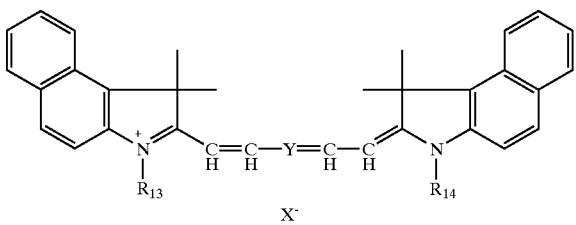

where $R_{13}$ and $R_{14}$ are the same or different and are each a hydrogen atom, a $C_{1-12}$ alkyl group, a $C_{6-12}$ aryl group, an alkenyl group, an aralkyl group or an alkinyl group; Y is a sulfur atom, a methine group or a chlorocyclohexene group; and X is an anion selected from $SbF_6^-$, $ClO_4^-$, $NO_3^-$ and a halogen ion.

2. A near infrared absorption material according to claim 1, wherein the transparent resin layer further contains at least one dithiol-nickel complex represented by the following formula (3):

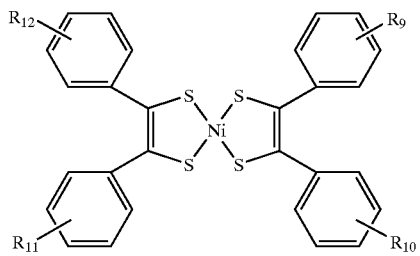

where $R_9$ to $R_{12}$ are the same or different and are each a hydrogen atom, a $C_{1-4}$ alkylene group, an aryl group, an aralkyl group, an alkylamino group, an alkoxy group or a halogen atom.

3. A near infrared absorption material according to claim 1, wherein the polymethine dye is represented by the following formula (5):

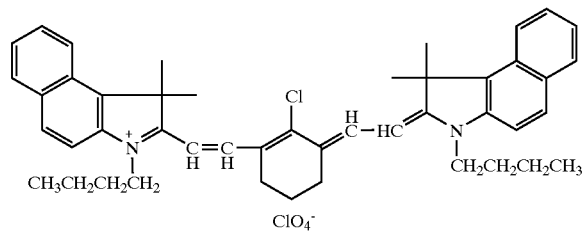

4. A near infrared absorption material according to claim 1, wherein the dye selectively absorbing a light of 550 to 620 nm wavelength region is at least one cyanin dye represented by the following formula (6):

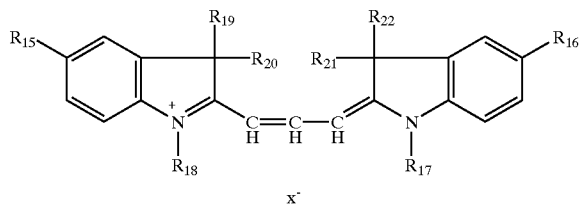

where $R_{15}$, $R_{16}$, $R_{19}$, $R_{20}$, $R_{21}$ and $R_{22}$ are the same or different and are each a hydrogen atom, a $C_{1-12}$ alkyl or alkoxy group, an amino group, a cyano group, a nitro group or a carboxyl group; $R_{17}$ and $R_{18}$ are the same or different and are each a hydrogen atom, a $C_{1-12}$ alkyl group, a $C_{6-12}$ aryl group, an alkenyl group, an aralkyl group or an alkinyl group; and X is an anion selected from $SbF_6^-$, $ClO_4^-$, $NO_3^-$ and a halogen ion.

5. A near infrared absorption material according to claim 4, wherein the dye selectively absorbing a light of 550 to 620 nm wavelength region is at least one dye selected from the dyes represented by the following formula (7):

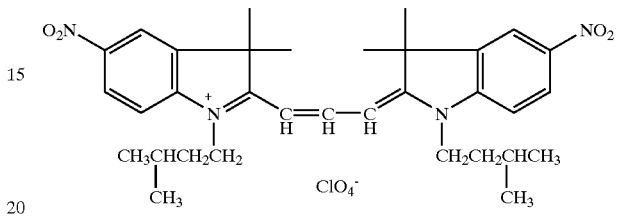

and the following formula (8):

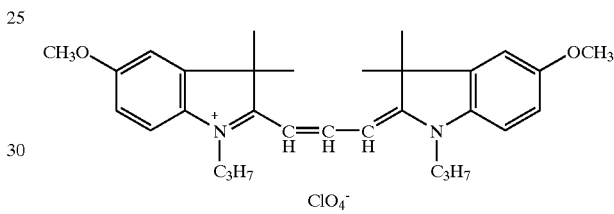

6. A near infrared absorption material according to claim 1, wherein the transparent substrate is made from a polycarbonate, a polyarylate or both of them.

7. A near infrared absorption material according to claim 1, wherein the transparent substrate is made from at least one of a polyethylene terephthalate, a polyethylene naphthalate and a polycycloolefin.

8. A near infrared absorption material comprising:

a transparent substrate, and at least a transparent resin layer containing a near infrared absorption dye which is a dithiol-nickel complex represented by the following formula (1):

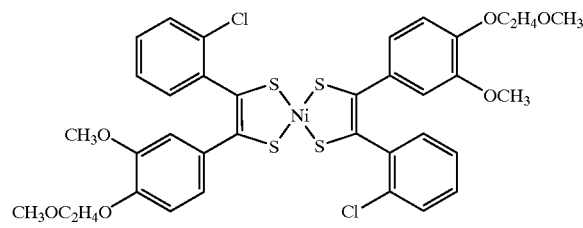

and at least one diimonium compound represented by the following formula (2):

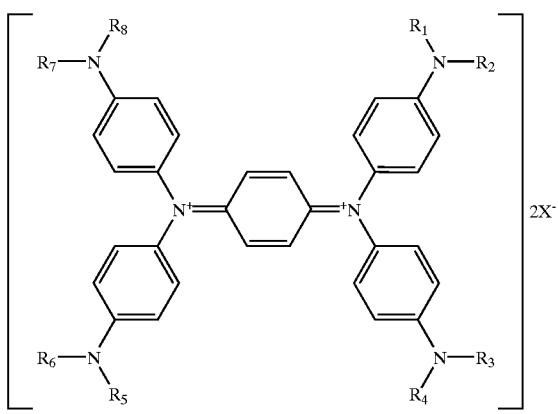

where $R_1$ to $R_8$ are the same or different and are each a hydrogen atom, a $C_{1-12}$ alkyl group or a $C_{6-12}$ aryl group; and X is an anion selected from $SbF_6^-$, $ClO_4^-$, $NO_3^-$ and a halogen ions and at least one polymethine dye represented by the following formula (4):

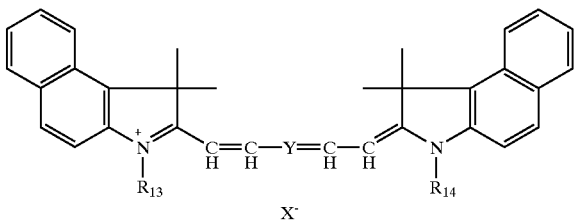

where $R_{13}$ and $R_{14}$ are the same or different and are each a hydrogen atom, a $C_{1-12}$ alkyl group, a $C_{6-12}$ aryl group, an alkenyl group, an aralkyl group or an alkinyl group; Y is a sulfur atom, a methine group or a chlorocyclohexene group; and X is an anion selected from $SbF_6^-$, $ClO_4^-$, $NO_3^-$, and a halogen ion;

and an adhesive layer containing a dye selectively absorbing a light of 550 to 620 nm wavelength region, both formed on the transparent substrate so that the adhesive layer becomes the outermost layer.

9. A near infrared absorption material according to claim 8, wherein the transparent resin layer further contains at least one dithiol-nickel complex represented by the following formula (3):

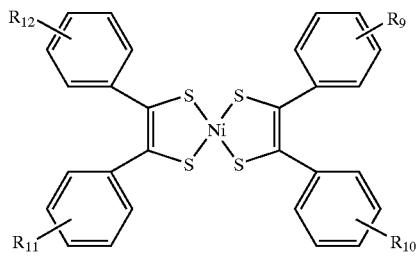

where $R_9$ to $R_{12}$ are the same or different and are each a hydrogen atom, a $C_{1-4}$ alkylene group, an aryl group, an aralkyl group, an alkylamino group, an alkoxy group or a halogen atom.

10. A near infrared absorption material according to claim 8, wherein the dye selectively absorbing a light of 550 to 620 nm wavelength region is at least one cyanin dye represented by the following formula (6):

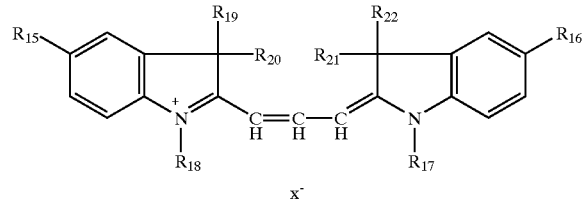

where $R_{15}$, $R_{16}$, $R_{19}$, $R_{20}$, $R_{21}$ and $R_{22}$ are the same or different and are each a hydrogen atom, a $C_{1-12}$ alkyl or alkoxy group, an amino group, a cyano group, a nitro group or a carboxyl group; $R_{17}$ and $R_{18}$ are the same or different and are each a hydrogen atom, a $C_{1-12}$ alkyl group, a $C_{1-12}$ aryl group, an alkenyl group, an aralkyl group or an alkinyl group; and X is an anion selected from $SbF_{6-}$, $ClO_4^-$, $NO_3^-$ and a halogen ion.

11. A near infrared absorption material according to claim 10, wherein the dye selectively absorbing a light of 550 to 620 nm wavelength region is at least one dye selected from the dyes represented by the following formula (7):

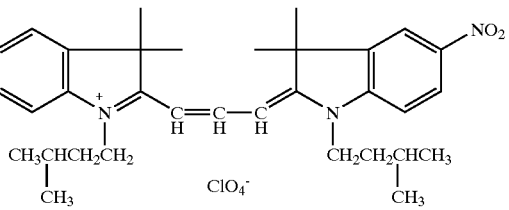

and the following formula (8):

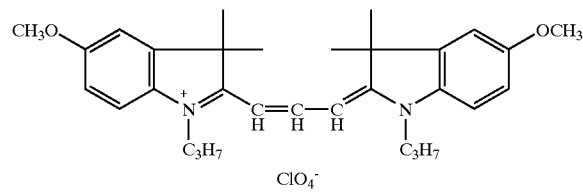

12. A near infrared absorption material according to claim 8, wherein the transparent substrate is made from a polycarbonate, a polyarylate or both of them.

13. A near infrared absorption material according to claim 8, wherein the transparent substrate is made from at least one of a polyethylene terephthalate, a polyethylene naphthalate and a polycycloolefin.

14. A filter for plasma display panel, made from a near infrared absorption material set forth in claim 1.

15. A filter for plasma display panel, made from a near infrared absorption material set forth in claim 8.

* * * * *